United States Patent
Gordon et al.

(10) Patent No.: US 10,915,290 B2
(45) Date of Patent: Feb. 9, 2021

(54) AUGMENTED REALITY SOFTWARE DEVELOPMENT KIT

(71) Applicant: Bose Corporation, Framingham, MA (US)

(72) Inventors: John Gordon, Lexington, MA (US); Glenn Gomes-Casseres, Framingham, MA (US); Santiago Carvajal, West Newton, MA (US); Naganagouda B. Patil, Ashland, MA (US); Rameshwar Sundaresan, South Grafton, MA (US); Kapil Krishnamurthy, Newark, CA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/295,271

(22) Filed: Mar. 7, 2019

(65) Prior Publication Data
US 2019/0278554 A1    Sep. 12, 2019

Related U.S. Application Data

(60) Provisional application No. 62/640,445, filed on Mar. 8, 2018, provisional application No. 62/641,122, filed on Mar. 9, 2018.

(51) Int. Cl.
*G06F 3/16* (2006.01)
*H04R 29/00* (2006.01)

(52) U.S. Cl.
CPC ............... *G06F 3/165* (2013.01); *G06F 3/16* (2013.01); *H04R 29/001* (2013.01)

(58) Field of Classification Search
CPC ....... H04R 29/001; H04S 7/304; G06F 3/165; G06F 3/16
See application file for complete search history.

(56) References Cited

U.S. PATENT DOCUMENTS

| | | | |
|---|---|---|---|
| 10,194,259 B1* | 1/2019 | Martin | H04S 7/304 |
| 2002/0151996 A1* | 10/2002 | Wilcock | G06F 3/167 |
| | | | 700/94 |
| 2013/0293539 A1 | 11/2013 | Perez et al. | |
| 2015/0063610 A1* | 3/2015 | Mossner | H04S 5/005 |
| | | | 381/307 |
| 2015/0222977 A1* | 8/2015 | Angel, Jr. | H04R 1/105 |
| | | | 381/74 |
| 2017/0295446 A1* | 10/2017 | Thagadur Shivappa | |
| | | | G06F 3/011 |

(Continued)

FOREIGN PATENT DOCUMENTS

| | | |
|---|---|---|
| EP | 3 067 781 | 9/2016 |
| GB | 2 546 983 | 8/2017 |
| WO | WO 2016/171895 | 10/2016 |

OTHER PUBLICATIONS

International Search Report and Written Opinion; PCT/US2019/021108; dated May 6, 2019; 15 pages.

(Continued)

*Primary Examiner* — Jason R Kurr
(74) *Attorney, Agent, or Firm* — Fish & Richardson P.C.

(57) ABSTRACT

A software tool includes a plurality of pre-coded API sensor modules for obtaining information from the sensors coupled to a mobile device and a pre-coded API audio module for playing audio content based on the information obtained from at least one of the sensors.

14 Claims, 5 Drawing Sheets

(56) References Cited

U.S. PATENT DOCUMENTS

2017/0318407 A1* 11/2017 Meister .................. H04S 7/303
2018/0014140 A1    1/2018 Milevski et al.
2018/0089583 A1*  3/2018 Iyer ........................ G06F 3/14

OTHER PUBLICATIONS

International Preliminary Report in Patentability in International Appln. No. PCT/US2019/021108, dated Sep. 8, 2020, 9 pages.

* cited by examiner

AUGMENTED REALITY SOFTWARE DEVELOPMENT KIT

CLAIM OF PRIORITY

This application claims the benefit of priority to U.S. Provisional Patent Application Ser. No. 62/640,445, filed on Mar. 8, 2018 and U.S. Provisional Patent Application Ser. No. 62/641,122, filed on Mar. 9, 2018, the entire contents of which are hereby incorporated by reference.

TECHNICAL FIELD

This disclosure generally relates to audio devices. More particularly, the disclosure relates to audio devices, such as wearable audio devices, including a location-based audio module for providing location-specific audio to the user at the wearable audio device.

BACKGROUND

Portable electronic devices, including headphone and other wearable audio systems are becoming more commonplace. However, the user experience with these audio systems is limited by the inability of these systems to adapt to different environments and locations.

RELATED APPLICATIONS

This application incorporates by reference the following applications: (i) U.S. Provisional Application 62/640,372, titled "Audio Content Engine for Audio Augmented Reality," (ii) U.S. Provisional Application 62/640,445, titled "Augmented Reality Software Development Kit," (iii) U.S. Provisional Application 62/640,427, titled "Prioritizing Delivery of Location-Based Personal Audio," and (iv) U.S. Provisional Application 62/640,524, titled "User-Interfaces for Audio-Augmented Reality," each of which was filed on Mar. 8, 2018.

SUMMARY

In general, one innovative aspect of the subject matter described in this specification can be embodied in a software tool that includes a plurality of pre-coded API sensor modules for obtaining information from the sensors coupled to a mobile device and a pre-coded API audio module for playing audio content based on the information obtained from at least one of the sensors.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the to following features, alone or in combination. The plurality of pre-coded API sensor modules may include a GPS module. The audio content may include at least one of: a playlist of audio files, an audio stream, or an Internet radio station. The plurality of pre-coded API sensor modules may include a pre-coded API for receiving an initiation command, and the initiation command comprises at least one of a tactile actuation, gesture actuation or a voice command at the wearable audio device or another device, and wherein the selection command comprises at least one of a tactile actuation, gesture actuation, or voice command at the wearable audio device or the another device. At least one of the plurality of pre-coded API sensor modules may include a module for obtaining information from sensors external to the mobile device. The software tool may enable development of applications that in response to the initiation command, provide a plurality of audio samples comprises providing a band-limited playback of each of the plurality of audio samples, and wherein in response to the selection command, the playback of the source of audio content associated with the selected audio sample comprises a full-bandwidth playback of the source of audio content. The software tool may enable development of applications that spatially delineated zones comprises a one-dimensional array or a two-dimensional array, and a size of each of the spatially delineated zones may be either equally distributed or unequally distributed in the array. The at least one of the plurality of pre-coded API sensor modules may enable the location of a wearable audio device based upon inertial information from an inertial measurement unit (IMU), wherein the IMU is located at the wearable audio device or at another device. The software tool may be provided as a library. The software tool may be integrated into an integrated development environment. The software tool may enable receiving data indicating the wearable audio device is proximate a geographic location associated with a localized audio message; providing a prompt to initiate playback of the localized audio message to a user of the wearable audio device; and initiating playback of the localized audio message at the wearable audio device in response to actuation of the prompt by the user. At least one of the plurality of pre-coded sensor modules may be configured to interface with at least one of an accelerometer or a gyroscope. At least one of the plurality of pre-coded sensor modules may enable detecting an ambient audio signal proximate the wearable audio device; and modifying the localized audio message at the wearable audio device based upon the ambient audio signal. The software tool may be configured to enable initiating playback of an audio beacon associated with the localized audio message based upon at least one of a position or an orientation of the wearable audio device, wherein the audio beacon is spatialized to indicate at least one of a direction or a proximity of the geographic location associated with the localized audio message. The spatialized audio beacon may adjust at least one audio characteristic thereof based upon a change in the at least one of the position or the orientation of the wearable audio device. The additional audio beacon may be initiated in a series following initiation of the audio beacon and the localized audio message. At least one module may be configured to receive a localized audio message and store the localized audio message in a local network or in a cloud storage system connected with the geographic location.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

It has become commonplace for those who either listen to electronically provided audio (e.g., audio from an audio source such as a mobile phone, tablet, computer, CD player, radio or MP3 player), those who simply seek to be acoustically isolated from unwanted or to possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be separately acoustically output with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones.

Aspects and implementations disclosed herein may be applicable to a wide variety of personal audio devices, such as a portable speaker, headphones, and wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as shoulder or body-worn acoustic devices that include one or more acoustic drivers to produce sound without contacting the ears of a user. It should be noted that although specific implementations of personal audio devices primarily serving the purpose of acoustically outputting audio are presented with some degree of detail, such presentations of specific implementations are intended to facilitate understanding through provision of examples, and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

Augmented reality (AR) is a direct or indirect live experience of a physical environment whose elements are "augmented" by computer-generated perceptual information. Typically, augmented reality has been achieved by superimposing, for example, a computer generated image over a live image of a real world location filtered through a computing device such as a camera on a smart phone, smart glasses, etc.

Figure 1:
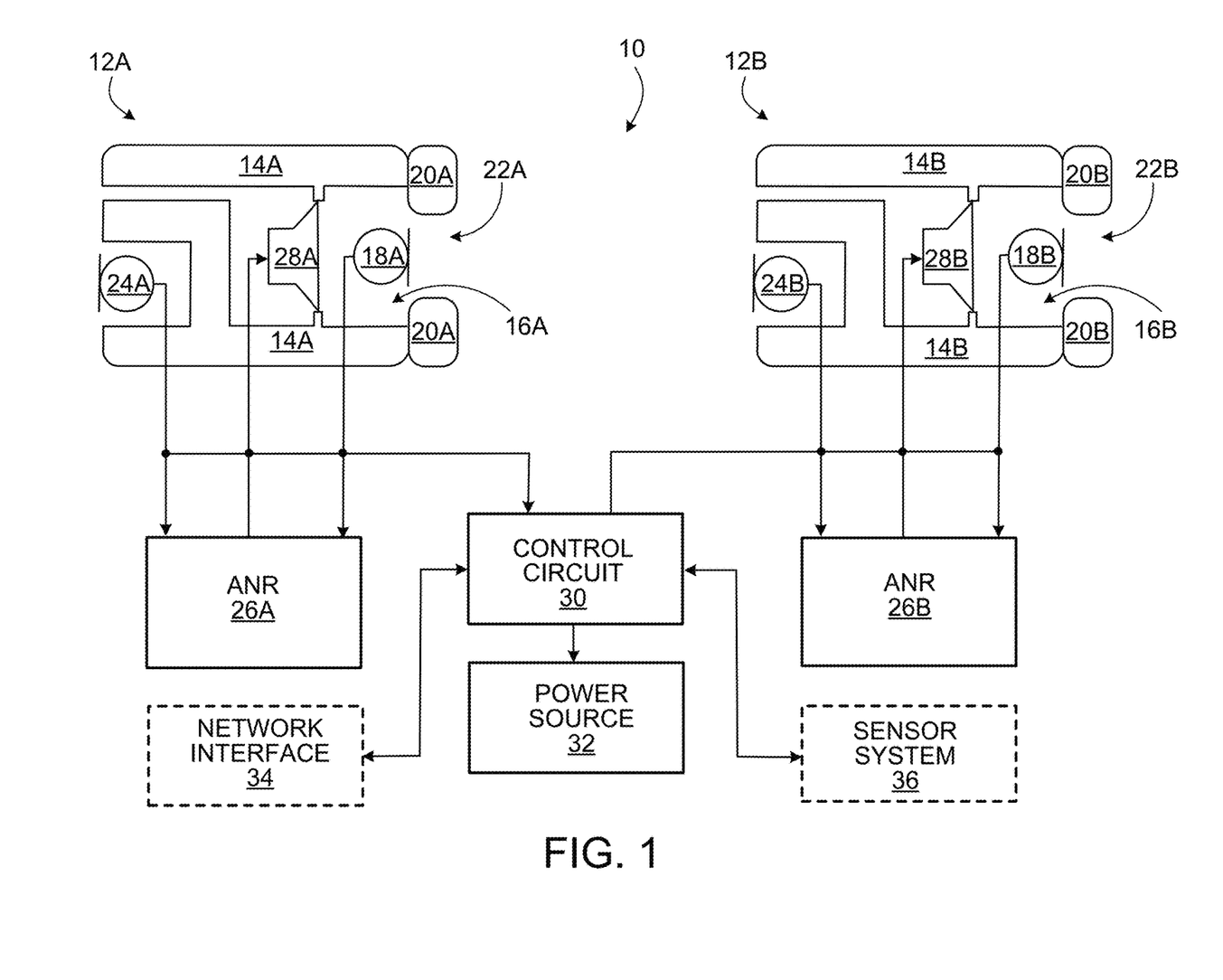
FIG. 1 is a block diagram depicting an example personal audio device according to various disclosed implementations.

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. An ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24, and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP) and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a wearer may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling location-based audio functions according to various particular implementations. It is understood that portions of the control system (e.g., instructions) could also be stored in a remote location or in a distributed location, and could be fetched or otherwise obtained by the control circuit 30 (e.g., via any communications protocol described herein) for execution. The instructions may include instructions for controlling location-based audio processes (i.e., the software modules include logic for processing inputs from a user and/or sensor system to manage audio streams), as well as digital signal processing and equalization. Additional details may be found in U.S. Patent Application Publication 20140277644, U.S. Patent Application Publication 20170098466, and U.S. Patent Application Publication 20140277639, the disclosures of which are incorporated herein by reference in their entirety.

Personal audio device 10 can also include a sensor system 36 coupled with control circuit 30 for detecting one or more conditions of the environment proximate personal audio device 10. Sensor system 36 can include one or more local sensors (e.g., inner microphones 18 and/or outer microphones 24) and/or remote or otherwise wirelessly (or hardwired) sensors for detecting conditions of the environment proximate personal audio device 10 as described herein. As described further herein, sensor system 36 can include a plurality of distinct sensor types for detecting location-based conditions proximate the personal audio device 10 as well detecting various user activities.

According to various implementations, the audio playback devices (which may be, for example, personal audio device 10 of FIG. 1) described herein can be configured to provide audio messages according to one or more factors. These particular implementations can allow a user to experience dynamic, personalized audio content in response to different environmental characteristics, e.g., as a user travels from one location to another location as part of an augmented reality experience. These implementations can enhance the user experience in comparison to conventional audio systems, e.g., portable audio systems or audio systems spanning distinct environments.

Figure 2:
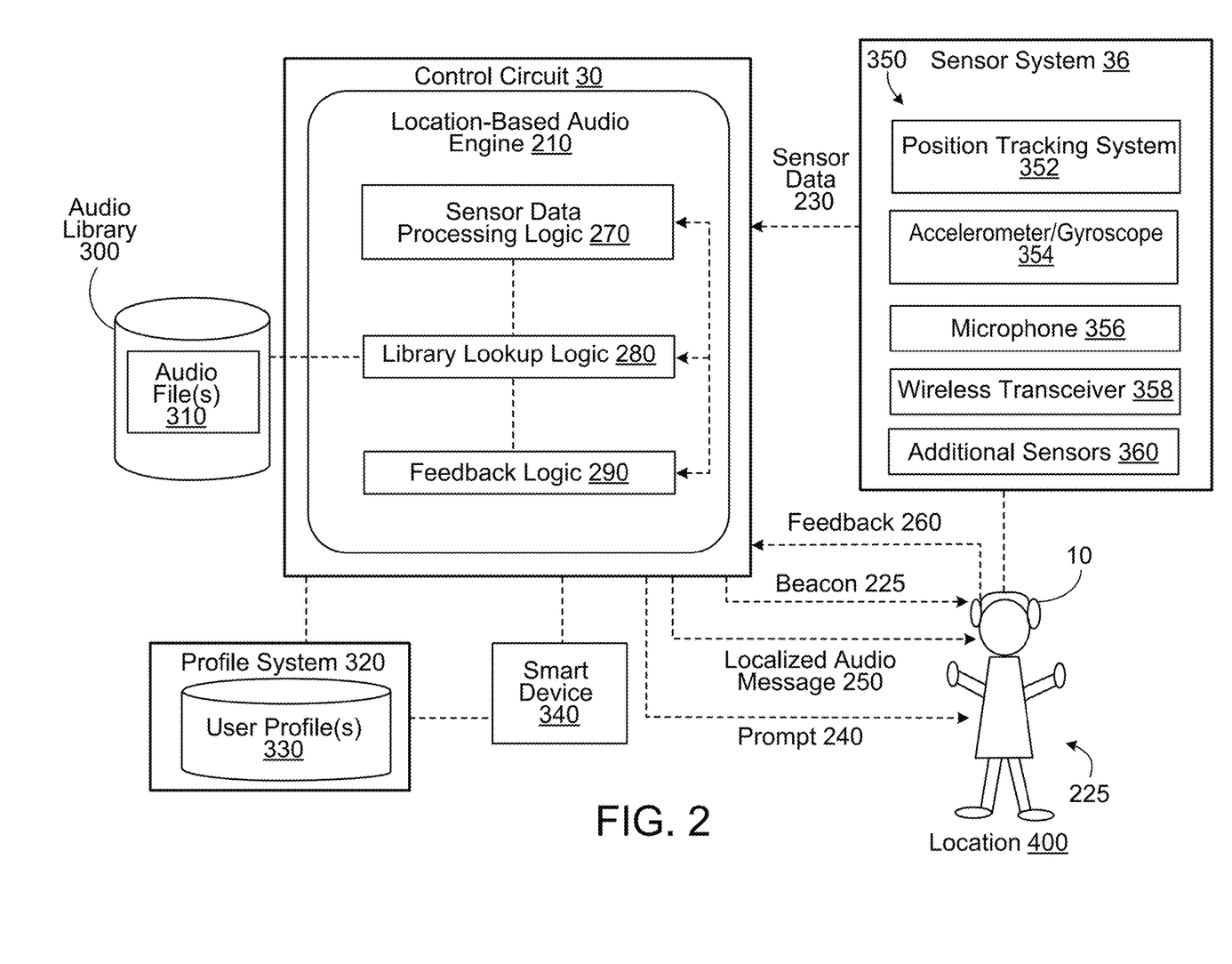
FIG. 2 shows a schematic data flow diagram illustrating control processes performed by a location-based audio engine in the personal audio device of FIG. 1.

As described with respect to FIG. 1, control circuit 30 can execute (and in some cases store) instructions for controlling augmented reality audio functions in personal audio device 10 and/or other audio playback devices in a network of such devices. As shown in FIG. 2, control circuit 30 can include a location-based audio engine 210 configured to implement modifications in audio outputs at the transducer (e.g., speaker) 28 (FIG. 1) in response to a change in location-based or other conditions. In various particular embodiments, location-based audio engine 210 is configured to receive data about an environmental condition from sensor system 36, and modify the audio output at transducer(s) 28 in response to environmental conditions or a change in environmental conditions. In particular implementations, the audio output includes an audio message provided in response to a particular stimuli, such as a specific geographic location, or proximate a specific geographic location, an audio cue, a beacon, or other stimuli. The audio message which is configured to vary with the change(s) in location and/or environmental condition. In certain cases, the localized audio message can only be provided to the user at or proximate the geographic location, providing an immersive experience at that location.

Returning to FIG. 2, data flows between location-based audio engine 210 and other components in personal audio device 10 are shown. It is understood that one or more components shown in the data flow diagram may be integrated in the same physical housing, e.g., in the housing of personal audio device 10, or may reside in one or more separate physical locations.

According to various implementations, control circuit 30 includes the location-based audio engine 210, or otherwise accesses program code for executing processes performed by location-based audio engine 210 (e.g., via network interface 34). Location-based audio engine 210 can include logic for processing sensor data 230 (e.g., receiving data indicating the location of the personal audio device, the proximity of personal audio device 10 to a geographic location, the direction the user of the personal audio device is facing, etc.) from sensor system 36, and providing a prompt 240 to the user 225 to initiate playback of an audio message 250 to the user 225 at the personal audio device 10. In various implementations, in response to actuation (e.g., feedback 260) of the prompt 240 by the user 225, the location-based audio engine 210 initiates playback of the audio message 250 at the personal audio device 10. In additional implementations, location-based audio engine 210 can provide a beacon 255 to user 225 to indicate a direction of an audio message 250 based upon the sensor data 230. The beacon 255 may indicate the direction of the audio message by modifying the audio message to sound as if it is coming from a particular direction, relative to the direction in which the user 225 is looking. In some cases, this logic can include sensor data processing logic 270, library lookup logic 280 and feedback logic 290.

Location-based audio engine 210 can be coupled (e.g., wirelessly and/or via hardwired connections in personal audio device 10) with an audio library 300, which can include audio files 310 for playback (e.g., streaming) at personal audio device 10 and/or a profile system 320 including user profiles 330 about one or more user(s) 225. Audio library 300 can include any library associated with digital audio sources accessible via network interface 34 (FIG. 1) described herein, including locally stored, remotely stored or Internet-based audio libraries. Audio files 310 can additionally include audio pins or caches created by other users, audio information provided by automated agents, and made accessible according to various functions described herein. User profiles 330 may be user-specific, community-specific, device-specific, location-specific or otherwise associated with a particular entity such as user 225. User profiles 330 can include user-defined playlists of digital music files, audio messages stored by the user 225 or another user, or other audio files available from network audio sources coupled with network interface 34 (FIG. 1), such as network-attached storage (NAS) devices, and/or a DLNA server, which may be accessible to the personal audio device 10 (FIG. 1) over a local area network such as a wireless (e.g., Wi-Fi) or wired (e.g., Ethernet) home network, as well as Internet music services such as Pandora®, vTuner®, Spotify®, etc., which are accessible to the audio personal audio device 10 over a wide area network such as the Internet. In some cases, profile system 320 is located in a local server or a cloud-based server, similar to any such server described herein. User profile 330 may include information about frequently played audio files associated with user 225 or other similar users (e.g., those with common audio file listening histories, demographic traits or Internet browsing histories), "liked" or otherwise favored audio files associated with user 225 or other similar users, frequency with which particular audio files are changed by user 225 or other similar users, etc. Profile system 320 can be associated with any community of users, e.g., a social network, subscription-based music service (such as a service providing audio library 300), and may include audio preferences, histories, etc. for user 225 as well as a plurality of other users. In particular implementations, profile system 320 can include user-specific preferences (as profiles 330) for audio messages and/or related notifications (e.g., beacons or beckoning messages). Profiles 330 can be customized according to particular user preferences, or can be shared by users with common attributes.

Location-based audio engine 210 can also be coupled with a smart device 340 that has access to a user profile (e.g., profile 330) or biometric information about user 225. It is understood that smart device 340 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 340 can include a conventional user interface for permitting interaction with user 225, and can include one or more network interfaces for interacting with control circuit 30 and other components in personal audio device 10 (FIG. 1). In some example implementations, smart device 340 can be utilized for: connecting personal audio device 10 to a Wi-Fi network; creating a system account for the user 225; setting up music and/or location-based audio services; browsing of content for playback; setting preset assignments on the personal audio device 10 or other audio playback devices; transport control (e.g., play/pause, fast forward/rewind, etc.) for the personal audio device 10; and selecting one or more personal audio devices 10 for content playback (e.g., single room playback or synchronized multi-room playback). In some cases, smart device 340 may also be used for: music services setup; browsing of content; setting preset assignments on the audio playback devices; transport control of the audio playback devices; and selecting personal audio devices 10 (or other playback devices) for content playback. Smart device 340 can further include embedded sensors for measuring biometric information about user 225, e.g., travel, sleep or exercise patterns; body temperature; heart rate; or pace of gait (e.g., via accelerometer(s).

The location-based audio engine 210 can be coupled with external sensors, including but not limited to cameras, GPS devices, gyroscopes, accelerometers, etc. In some implementations, the sensors may be within secondary devices in communication with the location-based audio engine 210. For example, the sensors may be included in a smart device, in a headset, glasses, or other similar device. The location-based audio engine can be configured to play particular audio, either pre-recorded or machine generated. Location-based audio engine 210 can be configured to receive sensor data 230 about distinct locations or other sensor signals from sensor system 36. Sensor data 230 is described herein with reference to the various forms of sensor system 36 configured for sensing such data.

As shown in FIG. 2, sensor system 36 can include one or more of the following sensors 350: a position tracking system 352; an accelerometer/gyroscope 354; a microphone (e.g., including one or more microphones) 356 (which may include or work in concert with microphones 18 and/or 24); and a wireless transceiver 358. These sensors are merely examples of sensor types that may be employed according to various implementations. It is further understood that sensor system 36 can deploy these sensors in distinct locations and distinct sub-components in order to detect particular environmental information relevant to user 225.

The position tracking system 352 can include one or more location-based detection systems such as a global positioning system (GPS) location system, a Wi-Fi location system, an infra-red (IR) location system, a Bluetooth beacon system, etc. In various additional implementations, the position tracking system 352 can include an orientation tracking system for tracking the orientation of the user 225 and/or the personal audio device 10. The orientation tracking system can include a head-tracking or body-tracking system (e.g., an optical-based tracking system, accelerometer, magnetometer, gyroscope or radar) for detecting a direction in which the user 225 is facing, as well as movement of the user 225 and the personal audio device 10. Position tracking system 352 can be configured to detect changes in the physical location of the personal audio device 10 and/or user 225 (where user 225 is separated from personal audio device 10) and provide updated sensor data 230 to the location-based audio engine 210 in order to indicate a change in the location 400 of user 225. Position tracking system 352 can also be configured to detect the orientation of the user 225, e.g., a direction of the user's head, or a change in the user's orientation such as a turning of to the torso or an about-face movement. In some example implementations, this position tracking system 352 can detect that user 225 has moved proximate a location with a localized audio message 250, or that the user 225 is looking in the direction of a location with a localized audio message 250. In particular example implementations, the position tracking system 352 can utilize one or more location systems and/or orientation systems to determine the location and/or orientation of the user 225, e.g., relying upon a GPS location system for general location information and an IR location system for more precise location information, while utilizing a head or body-tracking system to detect a direction of the user's viewpoint. In any case, position tracking system 352 can provide sensor data 230 to the location-based audio engine 210 about the position (e.g., location and/or orientation) of the user 225.

The accelerometer/gyroscope 354 can include distinct accelerometer components and gyroscope components, or could be collectively housed in a single sensor component, and may also be combined with magnetometers or other sensors. This component may be used to sense gestures based on movement of the user's body (e.g., head, torso, limbs) while the user is wearing the personal audio device 10 or interacting with another device (e.g., smart device 340) connected with personal audio device 10. This component may also be used to sense gestures based on interaction between the user and the audio device, such as tapping on the audio device. As with any sensor in sensor system 36, accelerometer/gyroscope 354 may be housed within personal audio device 10 or in another device connected to the personal audio device 10. In some example implementations, the accelerometer/gyroscope 354 can detect an acceleration of the user 225 and/or personal audio device 10 or a deceleration of the user 225 and/or personal audio device 10. In some cases the accelerometer/gyroscope 354 can be disposed, possibly with one or more additional sensors such as a magnetometer, within an inertial measurement unit (IMU) embedded in the personal audio device 10.

In some cases, streaming data from an IMU of the personal audio device 10 to a connected smart device 340 can be challenging. For example, such continuous sensing and streaming of data to the smart device 340 may consume an amount of power that is challenging to provide on a resource-constrained environment of a personal audio device 10. Further, executing complex processes natively on the personal audio device can require computation resources (and/or power) beyond what is available on some personal audio devices 10.

In some implementations, in view of computation and/or power constraints of a personal audio device, gesture/motion recognition using an IMU can be triggered on demand for a short period of time. The sensor data may then be outsourced to another device (e.g., a device with more processing capabilities) for the latter device to execute the gesture/motion recognition process. For example, a software development kit (SDK) facilitating development of applications for the personal audio device 10 can be configured to enable the use of "timed windows", which in turn enable the IMU of the personal audio device 10 to stream high sample rate sensor data over to a connected mobile device for a limited period of time. The mobile device can execute a gesture/motion recognition process on such data to recognize gestures/motions usable with technology described herein.

In some implementations, the above-described paradigm of sensing and processing IMU data can provide one or more of the following advantages and improvements. Allowing for streaming raw IMU data at a high sample rate can, in some cases, improve accuracy of a corresponding gesture/motion recognition process. A combination of gesture/motion recognition processes may be executed in parallel on the connected mobile device, which in turn may improve the overall accuracy of the recognition process. In some implementations, a preliminary recognition process (e.g., one that is less resource-intensive) can be executed on the personal audio device 10, while one or more additional processes (which may be more resource-intensive) can be executed on the connected mobile device. In some cases, the process executed on the personal audio device 10 can be executed using a high sample rate. In some implementations, using data sensed on demand and/or within a limited time window can improve false positive rates as compared to a substantially continuous process. Power consumption of a corresponding personal audio device, and/or overall battery life thereof, can be improved by allowing for the IMU to be switched off when not in use. In some implementations, upon expiration of the time period corresponding to a sensing window, a message can be sent to the personal audio device to turn off the sensors or even the entire IMU. In some implementations, the SDK may provide for a rate throttling feature, for example, to cap the number of requests an application can make for IMU data in a given period of time.

In one example, under the above-described paradigm of sensing and processing IMU data, a developer can configure an application to request motion-based input from a user within a specified time (e.g., "Play this question to the user and collect the response. Run for 5 secs"). The personal audio device executing the application, in response to corresponding instructions, can play the question, and switch on the IMU for the specified period of time.

In some implementations, the application may be executed on a connected mobile device, which in turn sends a message to the personal audio device instructing the IMU, or sensors thereof, to be turned on for the specified period of time (5 seconds, in the current example). In response, the personal audio device can switch on the IMU for the specified amount of time and stream the raw data collected in that time window to the connected mobile device, where a gesture/motion recognition application processes the data to recognize the response of the corresponding user. In some cases, the personal audio device may also process the data. Once a gesture/motion is recognized (or a timeout occurs without a definite result being generated), a callback may be fired accordingly.

In some implementations, the above-described paradigm of sensing and processing IMU data can allow a developer to develop applications with varying degrees of gesture recognition complexity. In some implementations, an application programming interface (API) can be configured to determine how the data is collected and processed. For example, in some cases, the data can be processed entirely on the connected mobile device (or in a cloud-based computing system). In other cases, the data may be processed entirely on the personal audio device. The data may also be processed partly on the mobile device and partly on the personal audio device. The duration of the time window may be a fixed predefined value, or configurable in accordance with the underlying application.

The microphone 356 (which can include one or more microphones, or a microphone array) can have similar functionality as the microphone(s) 18 and 24 shown and described with respect to FIG. 1, and may be housed within personal audio device 10 or in another device connected to the personal audio device 10. As noted herein, microphone 356 may include or otherwise utilize microphones 18 and 24 to perform functions described herein. Microphone 356 can be positioned to receive ambient audio signals (e.g., audio signals proximate personal audio device 10). In some cases, these ambient audio signals include speech/voice input from user 225 to enable voice control functionality. In some other example implementations, the microphone 356 can detect the voice of user 225 and/or of other users proximate to or interacting with user 225. In particular implementations, location-based audio engine 210 is configured to analyze one or more voice commands from user 225 (via microphone 356), and modify the localized audio message 250 based upon that command. In some cases, the microphone 356 can permit the user 225 to record a localized audio message 250 for later playback at the location, etc., by the user 225 or another user. In various particular implementations, the location-based audio engine 210 can permit the user 225 to record a localized audio message 250 to either include or exclude ambient sound (e.g., controlling ANR during recording), based upon the user preferences. In some examples, user 225 can provide a voice command to the location-based audio engine 210 via the microphone 356, e.g., to control playback of the localized audio message 250. In these cases, sensor data processing logic 270 can include logic for analyzing voice commands, including, e.g., natural language processing (NLP) logic or other similar logic.

Returning to sensor system 36, wireless transceiver 358 (comprising a transmitter and a receiver) can include, for example, a Bluetooth (BT) or Bluetooth Low Energy (BTLE) transceiver or other conventional transceiver device, and may be configured to communicate with other transceiver devices in distinct locations. In some example implementations, wireless transceiver 358 can be configured to detect an audio message (e.g., an audio message 250 such as an audio cache or pin) proximate personal audio device 10, e.g., in a local network at a geographic location or in a cloud storage system connected with the geographic location. For example, another user, a business establishment, government entity, tour group, etc. could leave an audio message 250 (e.g., a song; a pre-recorded message; an audio signature from: the user, another user, or an information source; an advertisement; or a notification) at particular geographic (or virtual) locations, and wireless transceiver 358 can be configured to detect this cache and prompt user 225 to initiate playback of the audio message.

As noted herein, in various implementations, the audio message 250 can include a pre-recorded message, a song, or an advertisement. However, in other implementations, the localized audio message can include an audio signature such as a sound, tone, line of music or a catch phrase associated with the location at which the audio message 250 is placed and/or the entity (e.g., user, information source, business) leaving the audio message 250. In some cases, the localized audio message 250 can include a signature akin to an "audio emoji", which identifies that localized audio message 250, e.g., as an introduction and/or closing to the message. In these examples, an entity could have a signature tone or series of tones indicating the identity of that entity, which can be played before and/or after the content of the localized audio message 250. These audio signatures can be provided to the user 225 (e.g., by location-based audio engine 210) generating the localized audio message 250 as standard options, or could be customizable for each user 225. In some additional cases, the localized audio message 250 can be editable by the user 225 generating that message. For example, the user 225 generating a localized audio message 250 can be provided with options to apply audio filters and/or other effects such as noise suppression and/or compression to edit the localized message 250 prior to making that localized message 250 available (or, "publishing") to other user(s) 225 via the location-based audio engine 210. Additionally, the localized audio message 250 can enable playback control (e.g., via location-based audio engine 210), permitting the listening user 225 to control audio playback characteristics such as rewind, fast-forward, skip, accelerated playback (e.g., double-time), etc.

In particular example implementations, the user 225 can "drop" a localized audio message 250 such as a pin when that user 225 is physically present at the geographic location. For example, the user 225 can share a live audio recording, sampled using microphone 356 or another microphone to provide a snapshot of the audio at that location. This localized audio message 250 can then be associated (linked) with the geographic location and made available to the user 225 or other users at a given time (or for a particular duration) when those users are also proximate the geographic location. In other example, the localized audio message 250 can be generated from a remote location, that is, a location distinct from the geographic location associated with the localized audio message 250. In these cases, the provider of the localized audio message 250 can link that message 250 with the geographic location via the location-based audio engine 210, such as through a mobile application or PC-based application of this engine 210. As described herein, access to localized audio message(s) 250 and creation of such message(s) 250 can be tailored to various user and group preferences. However, according to various implementations, the localized audio message 250 is only accessible to a user 225 that is proximate the geographic location associated with that message 250, e.g., a user 225 physically located within the proximity of the geographic location.

It is understood that any number of additional sensors 360 could be incorporated in sensor system 36, and could include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

A software development kit (SDK) can be provided. An SDK can be a collection of pre-coded modules that enable a developer to create custom applications and experiences for use with the location-based audio engine by third party programmers. The SDK can enable programmers to access sensor data and use the sensor data to cause audio messages to be played (and potentially generated) in response to various combinations of sensor data.

In some implementations, the SDK can enable programmers to allow a user to record audio associated with various combinations of sensor data. The SDK can provide a layered framework that defines a plurality of interacting software layers for communicating audio and sensor data between sensor devices and the location based audio engine. The SDK can enable a programmer to specify one or more actions to take in response to particular signals or combinations of signals from the sensors. In some implementations, the SDK can enable the programmer to register interest in a particular combination of signals. For example, the SDK may enable the user to request notification when the audio engine is at a particular location (for example, a longitude and latitude), when the user looks in a particular direction (for example, south and up), etc. In some implementations, the SDK can enable the programmer to register an interest in a combination of signals from different sensors (for example, the user is at a particular location looking in a particular direction.)

In some implementations, the SDK standardizes the access of a variety of different types of sensors. For example, the sensor data may be provided in a standard XML or JSON format. Events may be mapped into integer values encoded within the SDK for easy access comparison and translation. In some implementations, the SDK may be organized into classes or packages. In one example, each class may provide an interface to a different type of sensor. For example, a GPS class may provide access to current sensor data from a GPS device, while a gyroscope class may process access to current sensor data from a gyroscope.

In some implementations, the sensor classes may raise events or create callbacks when a particular set of circumstances occur. For example, if a user is at a particular location. In other implementations, an application developer may need to poll a sensor to receive data. However, it is frequently more efficient to have the SDK obtain the sensor data periodically and provide it to the application. In this way, the SDK can limit how frequently different sensor data is obtained and thereby preserve the battery life of mobile devices.

Figure 3:
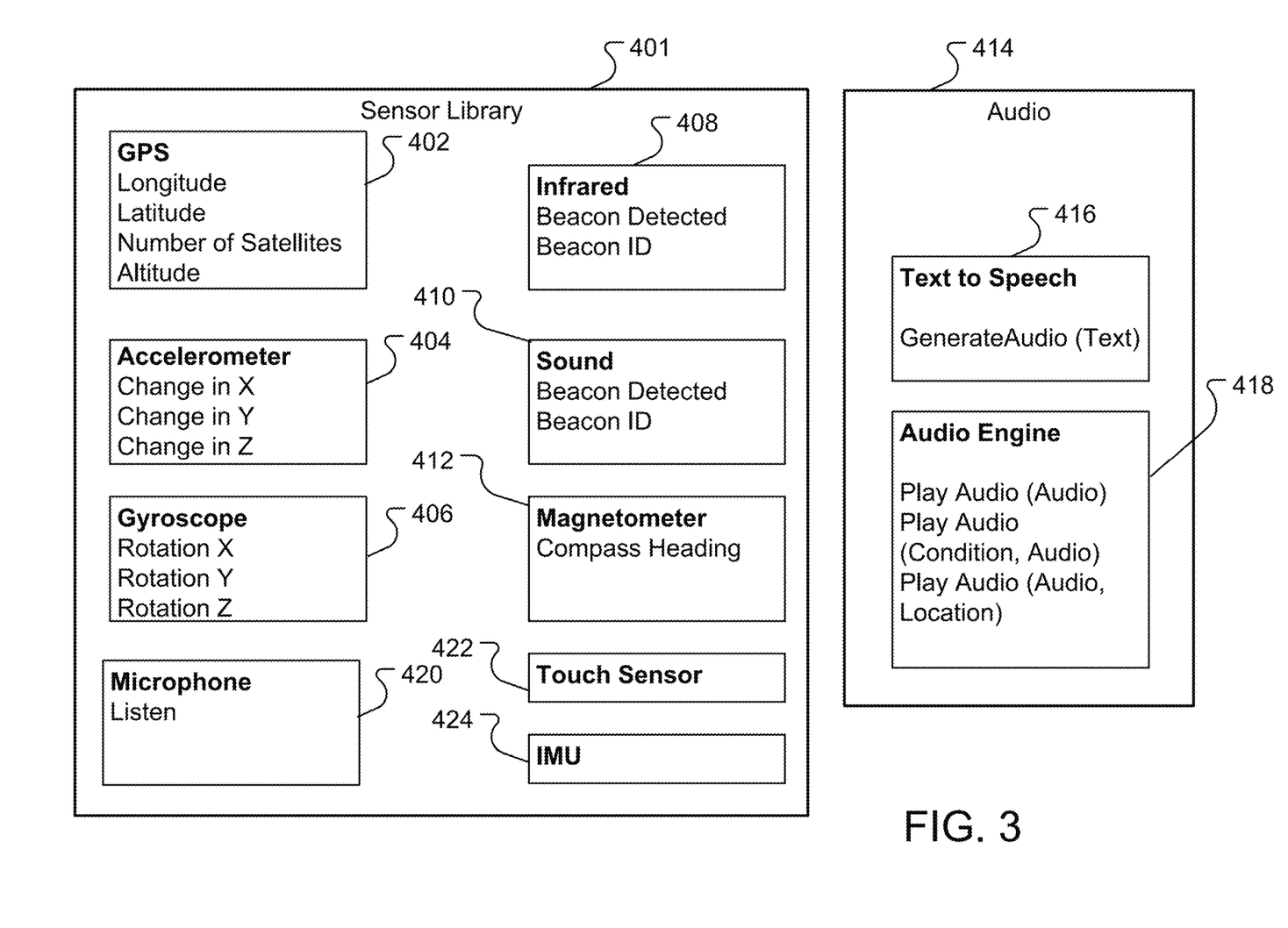
FIG. 3 illustrates an example of a portion of an SDK to enable augmented reality audio.

FIG. 3 illustrates an example of a portion of an SDK to enable augmented reality audio. The SDK may include, for example, a sensor library 401. The sensor library 401 may include classes, programs, libraries, etc., representing different types of sensors. For example, the sensor library 401 may include a GPS sensor class 402. The GPS sensor class 402 may be able to provide the current longitude and latitude of the device, as well as the number of satellites the GPS device can contact and the current altitude of the GPS device.

The sensor library 401 may also include an accelerometer class. The accelerometer class 404 may be able to provide the current change in acceleration in three cardinal directions, referred to as X, Y, and Z. The sensor library 401 may also include a gyroscope class 406. The gyroscope class may be able to provide the current rotation around three cardinal axes, referred to as X, Y, and Z.

The sensor library 401 may also include an infrared class 408. The infrared class 408 may include the ability to detect infrared beacons and provide a beacon ID. Similarly, the sensor library 401 may also include a sound class 410. The sound class 410 may be able to detect audio beacons (for example, beacons that are outside the range of human hearing) and an identifier associated with the beacon.

The sensor library 401 may also include a magnetometer class 412. The magnetometer class 412 may be able to provide the current detected compass heading.

Other sensors may also be integrated in to the SDK. For example, the SDK may include sensors that enable a user to interact with the system. Two examples include a microphone 420 and a touch sensor 422. Each of these sensors may be used to receive commands from a user of the audio device.

It should be understood that each of the exemplary classes described above provides a programmatic interface to physical sensors in communication with the audio engine. The communication may be wired or wireless. The sensors may be integrated into an audio device that includes the audio engine or may be included in another device that is in communication with the audio device that includes the audio engine. Further, the sensors described above are a representative sample of sensors that may be integrated with the audio device. Other sensors may also be used, including but not limited to, a camera or an inertial measurement unit 424.

The SDK may also include an audio library 414. The audio library 414 may include classes that provide access to audio tools, for example, a text to speech class 416 may provide the programmer the ability to generate synthetic speech based on a text string.

The SDK may also include a class to access the audio engine 418. The audio engine class 418 may provide the programmer with the ability to cause audio to be played. Playing the audio may be conditional on sensor data provided by one or more of the sensors. In some implementations, the audio engine 418, may include the ability to cause the audio to appear to come from a particular direction (left or right in the case of stereo or from a particular location in the case of surround sound or simulated surround sound.).

In some implementations, the SDK may include functions related to the direction the user is looking. For example, the SDK may enable a programmer to select different audio programs based on the direction a user is looking. For example, if the user is looking from in a 30 degree arc in front, one audio sample plays, if the user is looking from 15-45 degrees in one direction, a different audio sample plays.

In this manner, the programmer can enable the user to select between different audio samples. For example, the SDK may enable the programmer to create an application that determines sensor information in response to an action taken by a user. For example, if the user activates a touch sensor, the programmer can create a program that captures the direction the user is facing and uses that information to select a particular audio file or set of audio files. Detail describing a particular embodiment of directional audio selection is described in patent application TBD, Attorney Docket Number OG-18-035 incorporated herein by reference in its entirety.

In general, the SDK may include a plurality of pre-coded API sensor modules for obtaining information from the sensors coupled to a mobile device and a pre-coded API audio module for playing audio content based on the information obtained from at least one of the sensors. The audio content may be a playlist, an audio stream, internet radio, or any playable audio file.

In some implementations, sensor module may be capable of receiving an initiation command, and the initiation command may be a tactile actuation, gesture actuation or a voice command at the wearable audio device or another device. The initiation command can be used, for example, to trigger audio content to play.

The SDK may be provided as a collection of libraries. For example, the SDK may be provided as a dynamic link library (DLL), a JAVA archive (JAR), a PYTHON library, etc. In some implementations, the SDK may be designed to integrate with an integrated development environment (IDE). In general, an IDE is a software application that provides a robust set of utilities to computer programmers for software development. An IDE normally consists of a source code editor, build automation tools, and a debugger. Some IDEs provide the capability to integrate with additional toolkits using plug-ins. Plug-ins contribute functionality to the IDE by providing pre-defined extension points. In some implementations, an IDE includes a platform runtime, which can dynamically discover registered plug-ins and start them as needed. The SDK may be integrated into such a plug-in.

In some implementations, the SDK may be packaged with other software applications. For example, the SDK may be integrated into an operating system of a smart device, virtual reality headset, computer, or other device capable of executing an augmented reality audio program.

Figure 4:
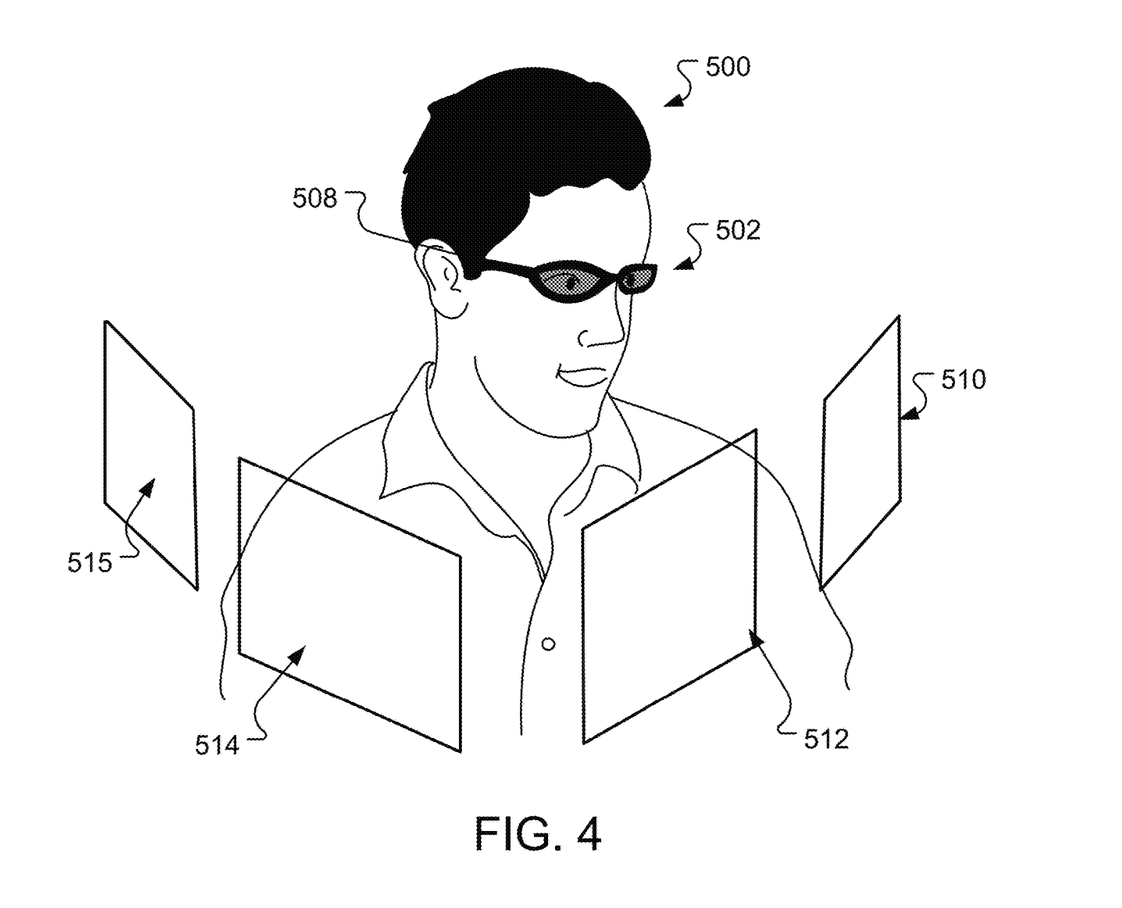
FIG. 4 illustrates a user selecting a language channel for an audio guided tour.

One example of using such a feature is to enable a user to select a particular language channel on a guided tour. FIG. 4 illustrates a user selecting a language channel for an audio guided tour. In this example, a user 500 is wearing smart glasses 502 with integrated sensors that enable an audio engine (now shown) to determine the direction the user is facing and to play a corresponding audio sample. For example, when the user is facing toward the 510 direction, the user may hear an instruction to provide an input in French (for example, by touching a touch sensor 508 integrated into the smart glasses 502). When the user is facing in the 512 direction, the instructions may be in English. When the user is facing in the 514 direction, the instructions may be in Spanish, and when the user is facing in the 516 direction, the instructions may be in German.

When the user touches the touch sensor 508 the direction the user is facing, and the corresponding language selection, is recorded.

Figure 5:
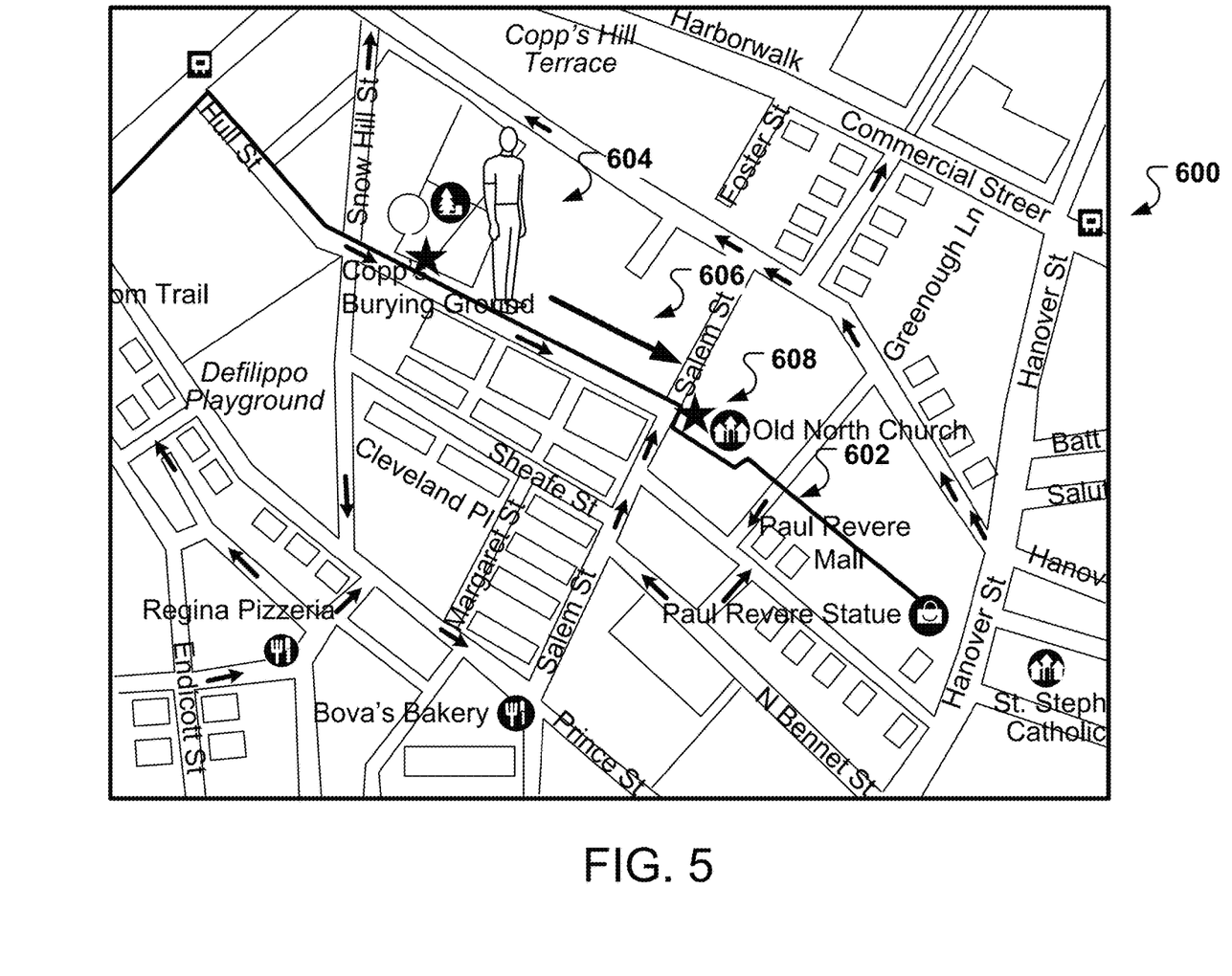
FIG. 5 continues the example of the augmented reality audio guided tour.

FIG. 5 continues the example of the augmented reality audio guided tour. The guided tour is one application that can be created using the SDK and is described briefly for exemplary purposes. A map 600 of the freedom trail 602 in 600 is presented. In this example, a user 604 walks along the freedom trail in the direction represented by the directional arrow 606 toward the Old North Church (represented by the location 608). As the user approaches the church, the audio device may detect, based on accelerometer and the GPS location, that the user is approaching from the north west. Accordingly, audio may play informing the user that the Old North Church is up ahead on the left. In some implementations, the audio may seem to the user to be coming from the Old North Church itself, further focusing the user's attention.

If, on the other hand, the user had been approaching the Old North Church from the opposite direction, the audio device would detect the direction and location of the user and inform the user that the Old North Church is up ahead on the right. In this manner, the audio experience may be customized for the user.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

What is claimed is:

1. One or more non-transitory machine-readable storage devices having encoded thereon computer-readable instructions representing a development kit for implementing an application programing interface (API) creating an audio augmented reality experience, the development kit comprising:
    a plurality of pre-coded API sensor modules for obtaining information from sensors coupled to a mobile device, wherein the plurality of pre-coded API sensor modules includes a pre-coded API for receiving an initiation command and a selection command,
        wherein the initiation command comprises at least one of a tactile actuation, gesture actuation or a voice command at a wearable audio device or another device, and
        wherein the selection command comprises at least one of a tactile actuation, gesture actuation, or voice command at the wearable audio device or the another device; and
    a pre-coded API audio module for playing audio content based on the information obtained from at least one of the sensors,
    wherein the development kit is integrated into an integrated development environment that includes a plurality of utilities for software development, and
    wherein the development kit enables development of applications that in response to receiving the initiation command, provide a band-limited playback of a plurality of audio samples, and in response to the selection command, provide a full-bandwidth playback of a selected audio sample from the plurality of audio samples.

2. The one or more non-transitory machine-readable storage devices of claim 1, wherein the plurality of pre-coded API sensor modules includes a GPS module.

3. The one or more non-transitory machine-readable storage devices of claim 1, wherein the audio content comprises at least one of: a playlist of audio files, an audio stream, or an Internet radio station.

4. The one or more non-transitory machine-readable storage devices of claim 1, wherein the plurality of pre-coded API sensor modules includes a pre-coded API for obtaining information from sensors external to the mobile device.

5. The one or more non-transitory machine-readable storage devices of claim 1, wherein at least one of the plurality of pre-coded API sensor modules enable determination of a location of a wearable audio device based upon inertial information from an inertial measurement unit (IMU), wherein the IMU is located at the wearable audio device or at another device.

6. The one or more non-transitory machine-readable storage devices of claim 1, wherein the development kit is provided as a library.

7. The one or more non-transitory machine-readable storage devices of claim 1, wherein the development kit enables:
    receiving data indicating a wearable audio device is proximate a geographic location associated with a localized audio message;
    providing a prompt to initiate playback of the localized audio message to a user of the wearable audio device; and
    initiating playback of the localized audio message at the wearable audio device in response to actuation of the prompt by the user.

8. The one or more non-transitory machine-readable storage devices of claim 1, wherein at least one of the plurality of pre-coded sensor modules are configured to interface with least one of an accelerometer or a gyroscope.

9. The one or more non-transitory machine-readable storage devices of claim 1, wherein at least one of the plurality of pre-coded sensor modules enable:
    detecting an ambient audio signal proximate a wearable audio device; and
    modifying a localized audio message at the wearable audio device based upon the ambient audio signal.

10. The one or more non-transitory machine-readable storage devices of claim 1, wherein the development kit is configured to enable initiating playback of an audio beacon associated with a localized audio message based upon at least one of a position or an orientation of a wearable audio device, wherein the audio beacon is spatialized to indicate at least one of a direction or a proximity of a geographic location associated with the localized audio message.

11. The one or more non-transitory machine-readable storage devices of claim 10, wherein the spatialized audio beacon adjusts at least one audio characteristic thereof based upon a change in the at least one of the position or the orientation of the wearable audio device.

12. The one or more non-transitory machine-readable storage devices of claim 11, wherein an additional audio beacon is initiated in a series following initiation of the audio beacon and the localized audio message.

13. The one or more non-transitory machine-readable storage devices of claim 10, further comprising at least one module configured to receive a localized audio message and store the localized audio message in a local network or in a cloud storage system connected with the geographic location.

14. The one or more non-transitory machine-readable storage devices of claim 1, wherein the API is configured to determine whether data acquired by an inertial measurement unit (IMU) is to be processed at the mobile device or at a wearable audio device.

* * * * *